(12) United States Patent
Sajassi

(10) Patent No.: US 7,646,778 B2
(45) Date of Patent: Jan. 12, 2010

(54) SUPPORT OF C-TAGGED SERVICE INTERFACE IN AN IEEE 802.1AH BRIDGE

(75) Inventor: Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 259 days.

(21) Appl. No.: 11/796,636

(22) Filed: Apr. 27, 2007

(65) Prior Publication Data

US 2008/0267198 A1  Oct. 30, 2008

(51) Int. Cl.
  *H04L 12/28* (2006.01)
  *H04L 12/66* (2006.01)
(52) U.S. Cl. ................................. 370/401; 370/463
(58) Field of Classification Search ............... None
  See application file for complete search history.

(56) References Cited

U.S. PATENT DOCUMENTS

| | | | |
|---|---|---|---|
| 5,818,842 A | 10/1998 | Burwell et al. | |
| 5,848,277 A | 12/1998 | Sheu | |
| 6,055,364 A | 4/2000 | Speakman et al. | |
| 6,078,590 A | 6/2000 | Farinacci et al. | |
| 6,188,694 B1 | 2/2001 | Fine et al. | |
| 6,304,575 B1 | 10/2001 | Carroll et al. | |
| 6,424,657 B1 | 7/2002 | Voit et al. | |
| 6,430,621 B1 | 8/2002 | Srikanth et al. | |
| 6,484,209 B1 | 11/2002 | Momirov | |
| 6,519,231 B1 | 2/2003 | Ding et al. | |
| 6,611,869 B1 | 8/2003 | Eschelbeck et al. | |
| 6,665,273 B1 | 12/2003 | Goguen et al. | |
| 6,667,982 B2 | 12/2003 | Christie et al. | |
| 6,668,282 B1 | 12/2003 | Booth, III et al. | |
| 6,693,878 B1 | 2/2004 | Daruwalla et al. | |
| 6,732,189 B1 | 5/2004 | Novaes | |
| 6,757,286 B1 | 6/2004 | Stone | |
| 6,763,469 B1 | 7/2004 | Daniely | |
| 6,785,232 B1 | 8/2004 | Kotser et al. | |
| 6,785,265 B2 | 8/2004 | White et al. | |
| 6,789,121 B2 | 9/2004 | Lamberton et al. | |
| 6,798,775 B1 | 9/2004 | Bordonaro | |
| 6,801,533 B1 | 10/2004 | Barkley | |
| 6,813,268 B1 | 11/2004 | Kalkunte et al. | |

(Continued)

OTHER PUBLICATIONS

Lahti "Quality of Service in the Poin-to-Point Protocol over Ethernet" in: Google Scholar (on line, <URL:http://www.e.kth.se/~e95_pla/exjobb/doc/Lahti_Thesis_QoS_in_PPPoE.pdf>) Oct. 1, 2000.

*Primary Examiner*—Min Jung
(74) *Attorney, Agent, or Firm*—The Law Offices of Bradley J. Bereznak

(57) ABSTRACT

In one embodiment, a Provider Backbone Edge Bridge (BEB) IEEE 802.1ah compliant apparatus includes a B-component having one or more provider backbone ports, and a first I-component coupled with the B-component, the first I-component being configured to support a S-tagged interface. A second I-component is also coupled with the B-component, the second I-component being configured to support a C-tagged interface, thereby facilitating direct connection to a device operating in compliance with IEEE 802.1Q specification. It is emphasized that this abstract is provided to comply with the rules requiring an abstract that will allow a searcher or other reader to quickly ascertain the subject matter of the technical disclosure.

21 Claims, 4 Drawing Sheets

U.S. PATENT DOCUMENTS

| | | |
|---|---|---|
| 6,826,698 B1 | 11/2004 | Minkin et al. |
| 6,829,252 B1 | 12/2004 | Lewin et al. |
| 6,839,348 B2 | 1/2005 | Tang et al. |
| 6,850,521 B1 | 2/2005 | Kadambi et al. |
| 6,850,542 B2 | 2/2005 | Tzeng |
| 6,852,542 B2 | 2/2005 | Mandel et al. |
| 6,892,309 B2 | 5/2005 | Richmond et al. |
| 7,009,983 B2 * | 3/2006 | Mancour .................... 370/401 |
| 7,047,314 B2 * | 5/2006 | Sato et al. .................. 709/238 |
| 7,113,512 B1 | 9/2006 | Holmgren et al. |
| 7,116,665 B2 | 10/2006 | Balay et al. |
| 7,173,934 B2 | 2/2007 | Lapuh et al. |
| 2002/0196795 A1 | 12/2002 | Higashiyama |
| 2003/0110268 A1 | 6/2003 | Kermarec et al. |
| 2003/0142674 A1 | 7/2003 | Casey |
| 2003/0177221 A1 | 9/2003 | Ould-Brahim et al. |
| 2004/0095940 A1 | 5/2004 | Yuan et al. |
| 2004/0125809 A1 | 7/2004 | Jeng |
| 2004/0158735 A1 | 8/2004 | Roese |
| 2004/0165525 A1 | 8/2004 | Burak |
| 2004/0165600 A1 | 8/2004 | Lee |
| 2004/0264364 A1 | 12/2004 | Sato |
| 2005/0007951 A1 | 1/2005 | Lapuh et al. |
| 2005/0030975 A1 | 2/2005 | Wright et al. |
| 2005/0063397 A1 | 3/2005 | Wu et al. |
| 2005/0099949 A1 | 5/2005 | Mohan et al. |
| 2005/0163049 A1 | 7/2005 | Yazaki et al. |
| 2005/0169279 A1 * | 8/2005 | Magd et al. ............... 370/395.5 |
| 2006/0182037 A1 | 8/2006 | Chen et al. |
| 2007/0086455 A1 * | 4/2007 | Allan et al. ................. 370/389 |
| 2007/0140118 A1 * | 6/2007 | Cetin ......................... 370/230 |
| 2008/0144644 A1 * | 6/2008 | Allan et al. ................. 370/401 |
| 2008/0159309 A1 * | 7/2008 | Sultan et al. ................ 370/401 |
| 2008/0170583 A1 * | 7/2008 | Sultan et al. ................ 370/422 |
| 2008/0172497 A1 * | 7/2008 | Mohan et al. ............... 709/249 |
| 2008/0219276 A1 * | 9/2008 | Shah .......................... 370/401 |
| 2008/0240122 A1 * | 10/2008 | Richardson et al. ......... 370/401 |
| 2009/0073997 A1 * | 3/2009 | Teng .......................... 370/401 |

* cited by examiner

SUPPORT OF C-TAGGED SERVICE INTERFACE IN AN IEEE 802.1AH BRIDGE

TECHNICAL FIELD

This disclosure relates generally to the field of digital computer networks and to local area network (LAN) technologies.

BACKGROUND

A LAN is a high-speed network that supports many computers connected over a limited distance (e.g., under a few hundred meters). A Virtual Local Area Network (VLAN) is mechanism by which a group of devices on one or more LANs that are configured using management software so that they can communicate as if they were attached to the same LAN, when in fact they are located on a number of different LAN segments. VLAN identifiers (VIDs) or tags, as defined in IEEE standard 802.1Q, are bit-fields that specify the VLAN to which a frame belongs. For example, the use of a service provider tag as part of the Ethernet frame header provides differentiation between traffic flow, i.e., separate service or customer instance. The newly proposed IEEE 802.1ad Provider Bridge specification defines an approach often referred to as "Q-in-Q" because it "stacks" VLAN tags to allow not only customer separation, but differential treatment of customer traffic through the service provider cloud. Additionally, the IEEE 802.1ah Provider Backbone Bridge (PBB) standard defines an approach of encapsulating an end-user's Ethernet frame inside a service provider media access control (MAC) address header and using a 24-bit service instance identifier (I-SID), thereby providing support for a much larger number of service instances. The IEEE 802.1ah standard thus allows for "MAC tunneling" encapsulation and bridging of frames across a provider backbone bridged network.

Although IEEE 802.1ah currently specifies the connectivity to/from 802.1ad bridges via the so-called S-tagged (provider VLAN) service interface, it does not specify how to connect 802.1ah bridges directly to CE devices that run IEEE 802.1Q via the so-called C-tagged (customer VLAN) service interface. Instead, clause 23.4 of version d2-4 of the 802.1ah specification describes support of "a C-Tagged interface for attachment to an 802.1Q C-VLAN network by placing an 802.1ad bridge in front of the 802.1ah bridge. The resulting component connections are Provider Backbone Bridge to Provider Bridge to Customer Bridge." The problem, however, is that supporting a C-tagged interface in an 802.1ah bridge in this manner is incompetent

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

Figure 1:
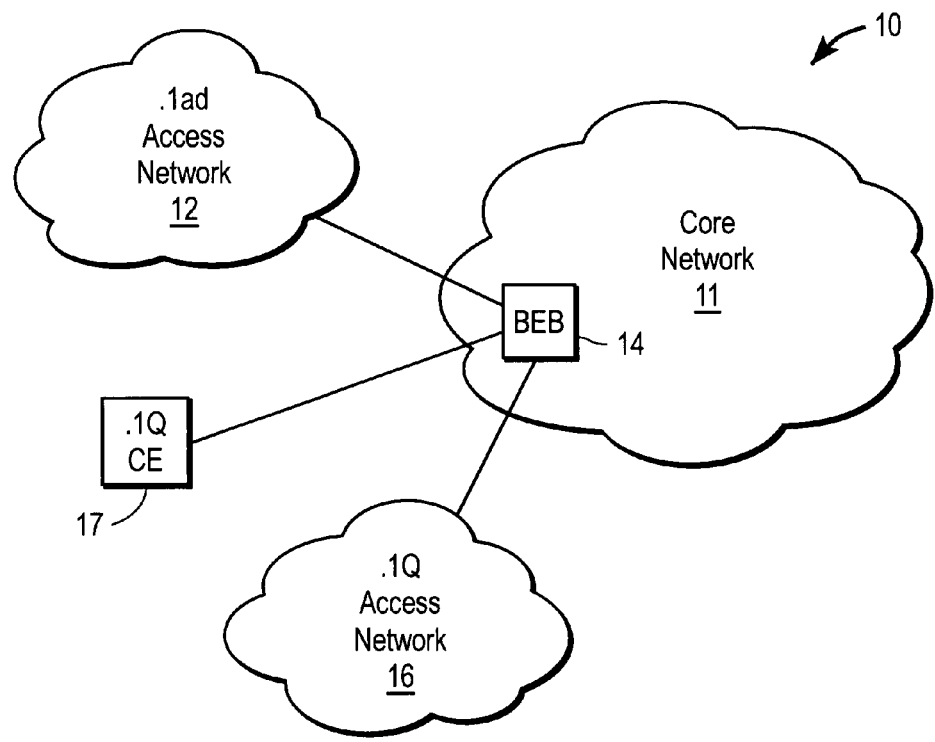
FIG. 1 illustrates an example packet-based network that includes an Ethernet provider backbone or core network.

In the following description specific details are set forth, such as device types, system configurations, communication methods, etc., in order to provide a thorough understanding of the present invention. However, persons having ordinary skill in the relevant arts will appreciate that these specific details may not be needed to practice the embodiments described.

In the context of the present application, a computer network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, mixers, control units, and personal computers. The nodes typically communicate by exchanging discrete frames or packets of data according to predefined protocols.

A customer edge (CE) device, as that term is used in the present disclosure, refers to customer node or device connecting to the service provider. A provider edge (PE) device refers to a device or node that is used to connect CE devices to the service. A backbone edge bridge (BEB) device is a provider edge device associated with a provider core or backbone network that is capable of Ethernet bridging or switching operations. A BEB may contain an I-component, a B-component, or both I and B components. A BEB may connect directly with one or more CEs, or with other provider edge devices, for example, associated with another service provider backbone network. More generally, a bridge is a device that connects two LANs or two segments of the same LAN that use the same protocol, such as Ethernet.

Overview

In one embodiment, a method is provided that includes the steps of accepting, by a provider edge (PE) bridge device, a first frame formatted to be compatible with IEEE 802.1ah specification; and accepting, by the PE bridge device, a second frame formatted to be compatible with IEEE 802.1Q specification.

In another embodiment, a method is provided that includes receiving, by a backbone edge bridge (BEB) device, a first frame; and recognizing in the first frame, an Ethertype for a S-tagged interface compliant with IEEE 802.1ad frame encapsulation. Subsequent steps include performing, by the BEB device, a first set of functions on the first frame; receiving, by the BEB device, a second frame; recognizing in the second frame, an Ethertype for a C-tagged interface compliant with IEEE 802.1Q frame encapsulation; and performing, by the BEB device, a second set of functions on the second frame.

In still another embodiment, logic is provided encoded in one or more media for execution. When executed, the logic is operable to receive, by a provider edge (PE) device of an Ethernet core network, a first frame; recognize in the first frame, an Ethertype for a S-tagged interface compliant with IEEE 802.1ad frame encapsulation; receive, by the PE device, a second frame sent directly from a customer edge (CE) device; and recognize in the second frame, an Ethertype for a C-tagged interface compliant with IEEE 802.1Q frame encapsulation.

In yet another embodiment, an apparatus is provided that includes a B-component having one or more provider backbone ports, and a first I-component coupled with the B-component, the first I-component being configured to support a S-tagged interface. A second I-component is coupled with the B-component, the second I-component being configured to support a C-tagged interface, thereby facilitating direct connection to a device operating in compliance with IEEE 802.1Q specification.

In yet another embodiment, an apparatus is provided that includes a backbone edge bridge (BEB) device operating in compliance with IEEE 802.1ah specification, the BEB including means for supporting a S-tagged interface; and means for supporting a C-tagged interface.

According to one embodiment of the present invention, an IEEE 802.1ah compliant BEB device is operable to support a C-tagged interface (within an I-component) obviating the need for an 802.1ad bridge as an intermediary device in the connection path between an 802.1Q compliant network or CE device and the BEB. In other words, there is no need to cascade an 802.1ad bridge with an 802.1ah bridge to support C-tagged interfaces. In order to support the C-tagged interface directly, the I-component within the BEB is configured to recognize both S-tagged interface (0x88a8) and C-tagged interface (0x8100) Ethertypes. (An Ethertype is a field in the Ethernet networking standard that is used to indicate which protocol is being transported on an Ethernet frame.) Additionally, the BEB device is operable to perform the same set of functions for both C-tagged frames and S-tagged frames.

FIG. 1 illustrates an example packet-based network 10 that includes an Ethernet core network 11 with a BEB device 14 operable to recognize both S-tagged service interface (0x88a8) and C-tagged interface (0x8100) Ethertypes. The S-tagged service interface is the interface defined between the CE device and the backbone provider edge bridge device. Frames passed through this interface include an S-tag field (i.e., the field that contains the service VLAN identifier information). This means that BEB 14 can communicate with devices operating in compliance with the 802.1ad standard, such as access network 12. In other words, BEB 14 accepts Ethernet frames compatible with the 802.1ad (S-tag) format. Additionally, BEB device 14 can communicate with devices operating in compliance with the 802.1Q standard, such as CE device 17, or access network 16, accepting Ethernet frames compatible with the 802.1Q (C-tag) format. To achieve this dual format compatibility, BEB includes software (or firmware) plug-ins, modules, or enhancements that implement the various features and functions described herein.

Figure 2:
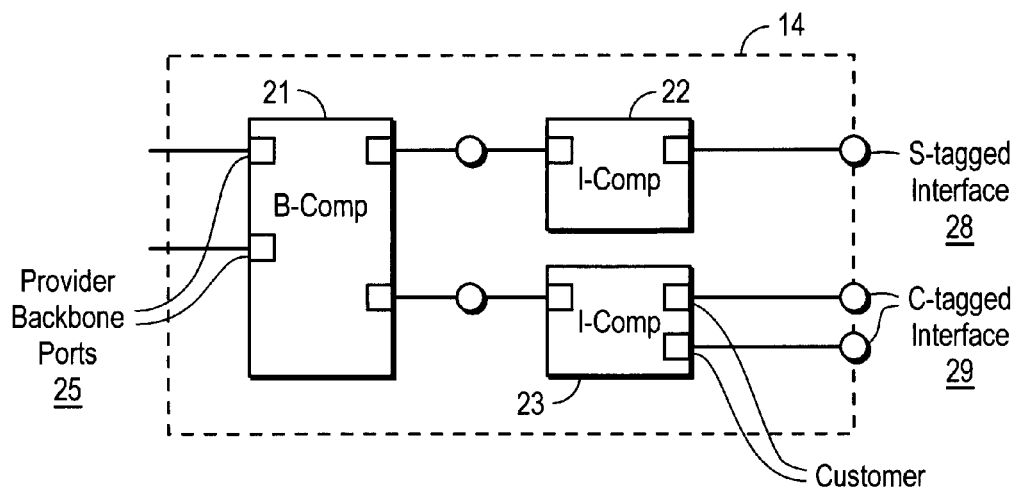
FIG. 2 illustrates an example backbone edge bridge shown in the core network of FIG. 1.

FIG. 2 illustrates an example provider backbone edge bridge (BEB) device 14 shown in the core network of FIG. 1. As shown, BEB 14 includes a B-component 21 interfacing with I-components 22 and 23. (In the example of FIG. 2, the ports are shown by small squares, while the interfaces are shown by circles.) B-component 21 supports bridging in the backbone network based on the B-MAC (the backbone source and destination MAC address fields defined in the 802.1ah provider MAC encapsulation header) and the B-tag (the field defined in the 802.1ah provider MAC encapsulation header that conveys the backbone VLAN identifier information). The BEB 14 includes provider backbone ports 25 along with internal ports that interface with I-components 22 & 23.

I-component 22 is a bridging component contained in the backbone edge bridge device that bridges in the customer space (customer MAC addresses, S-VLAN). In the example of FIG. 2, I-component 22 is shown having a port that provides an S-tagged interface 28 for BEB device 14. In accordance with IEEE 802.1ah, S-tagged interface 28 is specified to directly connect with devices or network "clouds" operating in compliance with 802.1ad (e.g., Ethernet frames formatted with 802.1ad encapsulation). Thus, whereas the B-component provides bridging in provider space (B-MAC, B-VLAN), the I-component provides bridging in customer space (C-MAC, S-VLAN).

The example of FIG. 2 also shows I-component 23 configured with customer instance ports 26 that provide C-tagged interface connections 29 for BEB 14. C-tagged interface 29 may be connected directly with customer edge devices or other devices associated with a network "cloud" operating in compliance with 802.1Q (e.g., Ethernet frames formatted with 802.1Q encapsulation). Because it is configured to recognize and process both S-tagged and C-tagged frames, provider edge device 14 may therefore be directly connected with an 802.1ad bridge or to any CE device (or cloud) that runs 802.1Q.

In the example shown, BEB device 14 may be configured, in one embodiment, to perform the same set of functions for C-tagged frames as for S-tagged frames. These functions may include: containing a single VLAN bridge component; resolving B-MAC addresses for use over a provider backbone network (PBBN); encapsulating/de-capsulating frames passing from provider instance ports to customer instance ports over C-tagged interface; mapping between C-VID values and I-SID values; mapping between PCP values of C-tagged frames and I-PCP values; mapping between DEI values of C-tagged frames and I-DEI values; stripping or carrying C-tags; implementing spanning tree root bridge protocol data unit (BPDU) announcement; terminating customer spanning tree by filtering spanning tree BPDUs delivered to the customer instance ports from the EISS; tunneling customer spanning tree by encapsulating spanning tree BPDUs delivered to the customer instance ports from EISS as though they were data frames; and tunneling customer spanning tree by encapsulating spanning tree BPDUs and delivered to the customer instance ports from the EISS and delivered in on a special service instance designated for spanning tree BPDUs.

Practitioners in the art will appreciate that, using the above functions in the I-component, the BEB can directly offer C-VLAN translation, C-VLAN bundling, and port-based services directly over the C-tagged interface without the need for an 802.1ad bridge.

Figure 3:
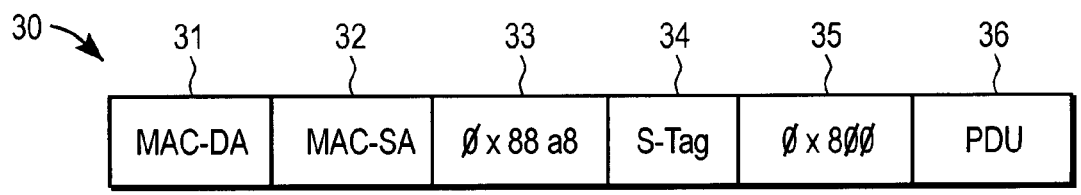
FIG. 3 illustrates an example Ethernet frame format compatible with 802.1ad encapsulation.

FIG. 3 illustrates an example Ethernet frame format compatible with 802.1ad encapsulation. Frame 30 includes a MAC destination address (MAC-DA) bit field 31; a MAC source address (MAC-SA) bit field 32; Ethertype field 33 (0x88a8), which indicates S-tag encapsulation (i.e., compatible with 802.1ad); S-tag field 34; Ethertype field 35 (0x800), which indicates Internet protocol packet encapsulation; and finally, the packet data unit (PDU) field 36, which contains the payload of the frame.

Figure 4:
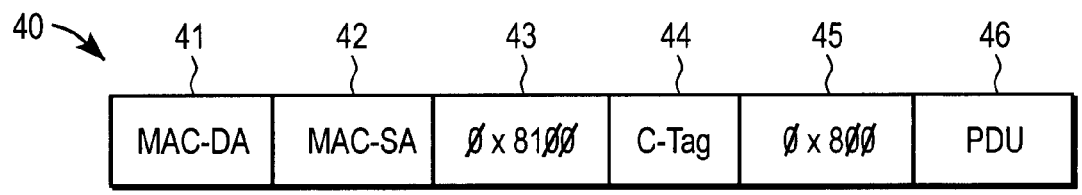
FIG. 4 illustrates an example Ethernet frame format compatible with 802.1Q encapsulation.

FIG. 4 illustrates an example Ethernet frame format compatible with 802.1Q encapsulation. Similar to the example above, frame 40 includes a MAC destination address (MAC-DA) bit field 41 and a MAC source address (MAC-SA) bit field 42. In this case, Ethertype field 43 (0x8100) indicates an 802.1Q-tagged frame (C-tagged). Field 43 is followed by C-tag field 44 and then Ethertype field 45 (0x800), which indicates IP packet encapsulation. Payload field 46 completes the frame.

Figure 5:
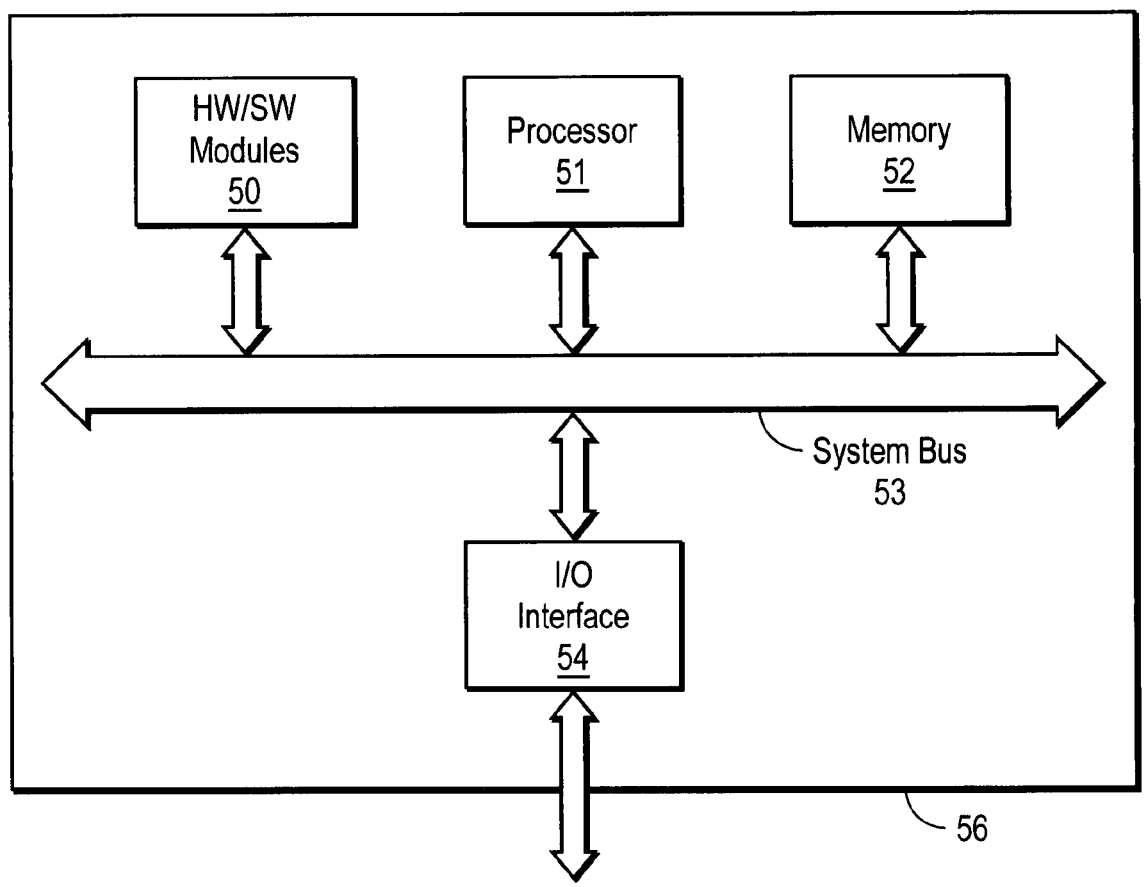
FIG. 5 illustrates an example network device or node.

FIG. 5 illustrates an example node 56, which comprises a number of basic subsystems including a processor subsystem 51, a main memory 52 and an input/output (I/O) subsystem 54. Data may be transferred between main memory ("system memory") 52 and processor subsystem 51 over a memory bus (not shown), and between the processor and I/O subsystems over a system bus 53. Examples of the system bus may include the conventional lightning data transport (or hyper transport) bus and the conventional peripheral component [computer] interconnect (PCI) bus. Node 56 may also comprise other hardware units/modules 50 coupled to system bus 53 for performing additional functions. (The term "module" is to be understood as being synonymous with hardware devices and computer-executable software code, programs or routines.) Processor subsystem 51 may comprise one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

Figure 6:
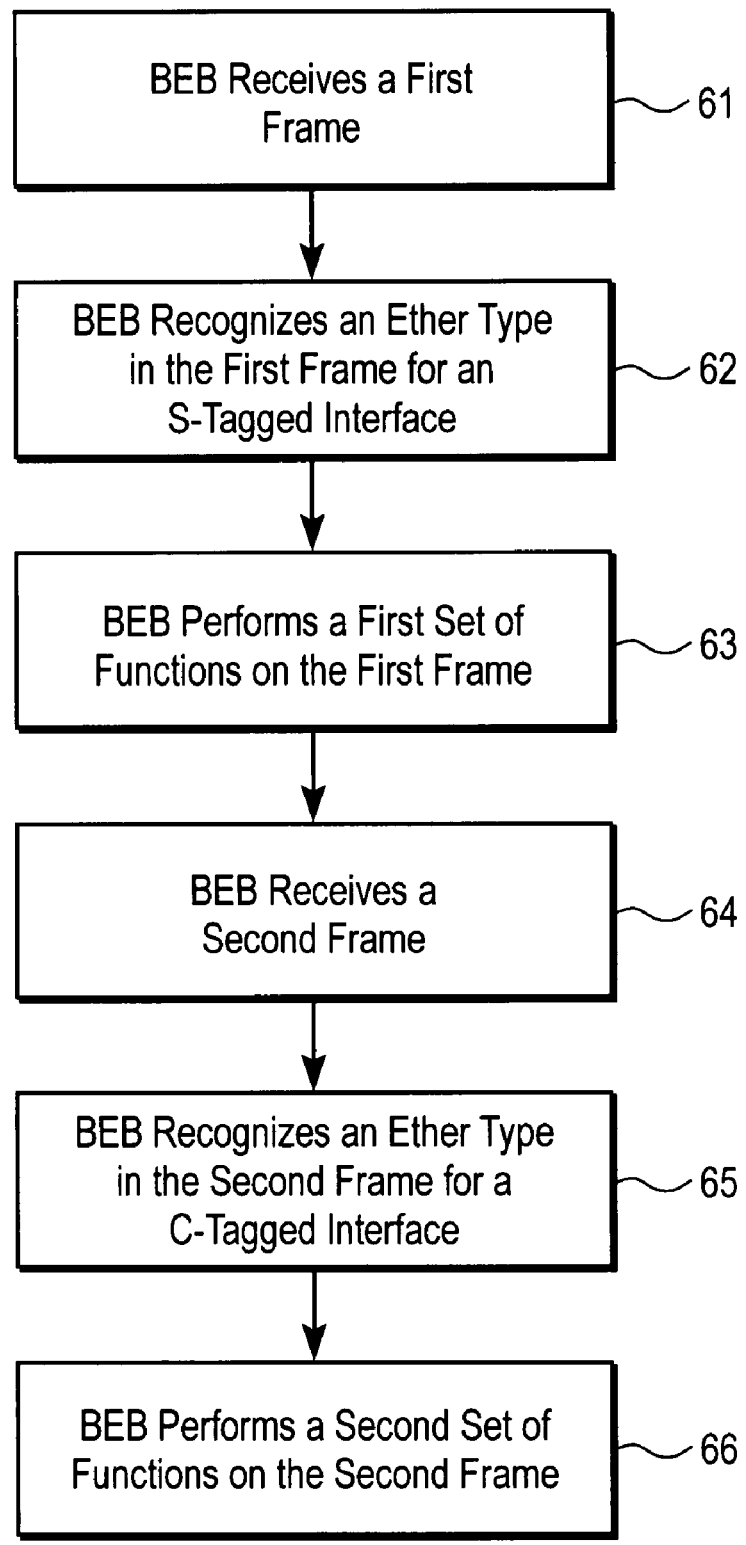
FIG. 6 illustrates an example method of operation for the system of FIG. 1.

FIG. 6 illustrates an example method of operation for the system of FIG. 1. The method starts at block 61, with a backbone edge bridge (BEB) device, receiving a first frame. The BEB device then recognizes an Ethertype in the first frame for an S-tagged interface, i.e., compliant with IEEE 802.1ad frame encapsulation, thereby accepting the first frame. This is shown at block 62. As discussed previously, frames passing through the S-tagged service interface contain the S-tag field that conveys service VLAN identifier information. After recognizing the S-tag Ethertype, the BEB device may process the frame by performing one or more of the functions listed above (block 63).

A second frame is then received by the BEB device (block 64) and recognized as having an Ethertype for a C-tagged interface compliant with IEEE 802.1Q frame encapsulation (block 65). Upon recognizing (accepting) the C-tagged interface Ethertype in the second frame, the BEB device may proceed to perform one or more of a second set of functions listed on the second frame (block 66). The second set of functions may be the same as, or different from, the first set of functions performed on the first frame. The second set of functions may include any of the functions previously listed above.

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. For instance, while the preceding examples contemplate a BEB or similar network node associated with a provider core network, the device concepts disclosed above are applicable to any node that implements an IEEE 802.1ah bridge or functionality. Accordingly, the specification and drawings are to be regarded in an illustrative rather than a restrictive sense.

I claim:

1. A method comprising:
   receiving, by a backbone edge bridge (BEB) device, a first frame;
   recognizing in the first frame, an Ethertype for a S-tagged interface compliant with IEEE 802.1ad frame encapsulation;
   performing, by the BEB device, a first set of functions on the first frame;
   receiving, by the BEB device, a second frame; and
   recognizing in the second frame, an Ethertype for a C-tagged interface compliant with IEEE 802.1Q frame encapsulation.

2. The method of claim 1 further comprising performing, by the BEB device, a second set of functions on the second frame.

3. The method of claim 2 wherein the first set of functions and second set of functions are identical.

4. The method of claim 2 wherein the first and second sets of functions includes resolving media access control (MAC) addresses for use over a provider backbone network.

5. The method of claim 1 wherein the BEB device is associated with a provider Ethernet core network.

6. The method of claim 1 wherein the second frame is received directly from a customer edge (CE) device.

7. The method of claim 1 wherein the first frame is received from a provider edge device associated with a first access network operating in compliance with IEEE 802.1ad specification.

8. The method of claim 1 wherein the first frame includes a provider Virtual Local Area Network (VLAN) tag (S-tag).

9. The method of claim 1 wherein the second frame includes a customer Virtual Local Area Network (VLAN) tag (C-tag).

10. The method of claim 1 wherein the second frame is received from a provider edge device associated with a second access network operating in compliance with IEEE 802.1Q specification.

11. An apparatus comprising:
   a B-component having one or more provider backbone ports;
   a first I-component coupled with the B-component, the first I-component being configured to support a S-tagged interface; and
   a second I-component coupled with the B-component, the second I-component being configured to support a C-tagged interface, thereby facilitating direct connection to a device operating in compliance with IEEE 802.1Q specification.

12. The apparatus of claim 11 wherein the second I-component includes one or more customer instance ports.

13. The apparatus of claim 11 wherein the device comprises a customer edge device.

14. The apparatus of claim 11 wherein the S-tagged interface is connected to receive with IEEE 802.1ad-tagged frames.

15. An apparatus comprising:
   a backbone edge bridge (BEB) device operating in compliance with IEEE 802.1ah specification, the BEB including:
   means for receiving a first frame and for recognizing in the first frame an Ethertype for a S-tagged interface compliant with IEEE 802.1ad frame encapsulation; and
   means for receiving a second frame and for recognizing in the second frame an Ethertype for a C-tagged interface compliant with IEEE 802.1Q frame encapsulation.

16. The apparatus of claim 15 wherein the first frame is received from a provider edge device associated with a first access network operating in compliance with IEEE 802.1ad specification.

17. The apparatus of claim 15 wherein the second frame is received from a provider edge device associated with a second access network operating in compliance with IEEE 802.1Q specification.

18. The apparatus of claim 15 wherein the second frame is received directly from a customer edge (CE) device operating in compliance with IEEE 802.1Q specification.

19. The apparatus of claim 15 wherein the means for receiving the first frame is also for performing a first set of functions on the first frame, the first set of functions including resolving media access control (MAC) addresses for use over a provider Ethernet core network.

20. The apparatus of claim 19 wherein the means for receiving the second frame is also for performing the first set of functions on the first frame.

21. The apparatus of claim 19 wherein the first set of functions includes resolving media access control (MAC) addresses for use over the provider Ethernet core network.

* * * * *